US011412714B2

(12) United States Patent
Chen

(10) Patent No.: US 11,412,714 B2
(45) Date of Patent: Aug. 16, 2022

(54) PET MONITORING METHOD AND PET MONITORING SYSTEM

(71) Applicant: Acer Incorporated, New Taipei (TW)

(72) Inventor: Jui-Lin Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 297 days.

(21) Appl. No.: 16/727,931

(22) Filed: Dec. 27, 2019

(65) Prior Publication Data

US 2020/0205382 A1   Jul. 2, 2020

(30) Foreign Application Priority Data

Dec. 28, 2018 (TW) .................................. 107147885

(51) Int. Cl.
*A01K 29/00* (2006.01)
*G06V 20/52* (2022.01)

(52) U.S. Cl.
CPC ............ *A01K 29/005* (2013.01); *G06V 20/52* (2022.01)

(58) Field of Classification Search
CPC ... G06K 9/00771; A01K 29/005; G06V 20/52
See application file for complete search history.

(56) References Cited

U.S. PATENT DOCUMENTS

| 2003/0083822 | A2 | 5/2003 | Brunner et al. |
| 2012/0299731 | A1* | 11/2012 | Triener .................. A01K 31/12 340/573.1 |
| 2015/0009325 | A1 | 1/2015 | Kardashov |
| 2015/0181840 | A1 | 7/2015 | Tupin, Jr. et al. |
| 2016/0262356 | A1 | 9/2016 | Perez-Camargo et al. |
| 2018/0213748 | A1* | 8/2018 | Eom ...................... A01K 23/00 |
| 2020/0205381 | A1* | 7/2020 | Wernimont .......... A01K 29/005 |
| 2020/0267936 | A1* | 8/2020 | Tran ..................... A01K 29/005 |

FOREIGN PATENT DOCUMENTS

| CN | 101937606 | 1/2011 |
| CN | 102142179 | 8/2011 |

* cited by examiner

*Primary Examiner* — Kenny A Cese
(74) *Attorney, Agent, or Firm* — JCIPRNET

(57) ABSTRACT

A pet monitoring method and a pet monitoring system according to embodiments of the disclosure are provided. The method is described hereinafter. An image is obtained by a photographic device. At least one of an exercise status detection, an excretion status detection and a danger status detection of a pet is performed according to the image. Pet management information is presented on a management interface of a remote device according to a detection result.

16 Claims, 5 Drawing Sheets

PET MONITORING METHOD AND PET MONITORING SYSTEM

CROSS-REFERENCE TO RELATED APPLICATION

This application claims the priority benefit of Taiwan Application No. 107147885, filed on Dec. 28, 2018. The entirety of the above-mentioned patent application is hereby incorporated by reference herein and made a part of this specification.

BACKGROUND OF THE INVENTION

Technical Field

The disclosure relates to an image monitoring system and, more particularly, to a pet monitoring method and a pet monitoring system.

Description of Related Art

The existing home surveillance system works by transmitting surveillance images to a remote user through home security cameras, but people generally cannot watch the surveillance images for a long time. Therefore, if a pet (a dog, for example) exhibits dangerous behavior (such as climbing on the TV) or hides excrement at a certain time point, the user does not immediately detects the instance. In addition, pets need to spend some time exercising every day. Although the amount of exercise of a pet can be automatically obtained through a wearable device for measuring physical information that is worn by the pet, some pets may not get used to the wearable device.

SUMMARY OF THE INVENTION

The disclosure provides a pet monitoring method and a pet monitoring system capable of automatically analyzing an image and performing at least one of an exercise status detection, an excretion status detection and a danger status detection of a pet, so that the user enhances the efficiency of managing the pet at home while the user is out.

An embodiment of the disclosure provides a pet monitoring method. The pet monitoring method includes: obtaining an image by a photographic device; performing at least one of an exercise status detection, an excretion status detection and a danger status detection of a pet according to the image; and presenting pet management information on a management interface of a remote device according to a detection result.

An embodiment of the disclosure provides another pet monitoring system. The pet monitoring system includes: a photographic device, a computing host and a remote device. The photographic device is configured to obtain an image. The computing host is connected to the photographic device and is configured to perform at least one of an exercise status detection, an excretion status detection and a danger status detection of a pet according to the image. The remote device is configured to present pet management information on a management interface according to a detection result of the computing host.

In view of the above, after the image about the pet is obtained, the at least one of an exercise status detection, an excretion status detection and a danger status detection can be performed by analyzing the image and then the pet management information is presented on the management interface of the remote device according to the detection result. When the user goes out, the system can automatically report a motion status of the pet at home to the user, thereby enhancing the efficiency of managing the pet at home while the user is out.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
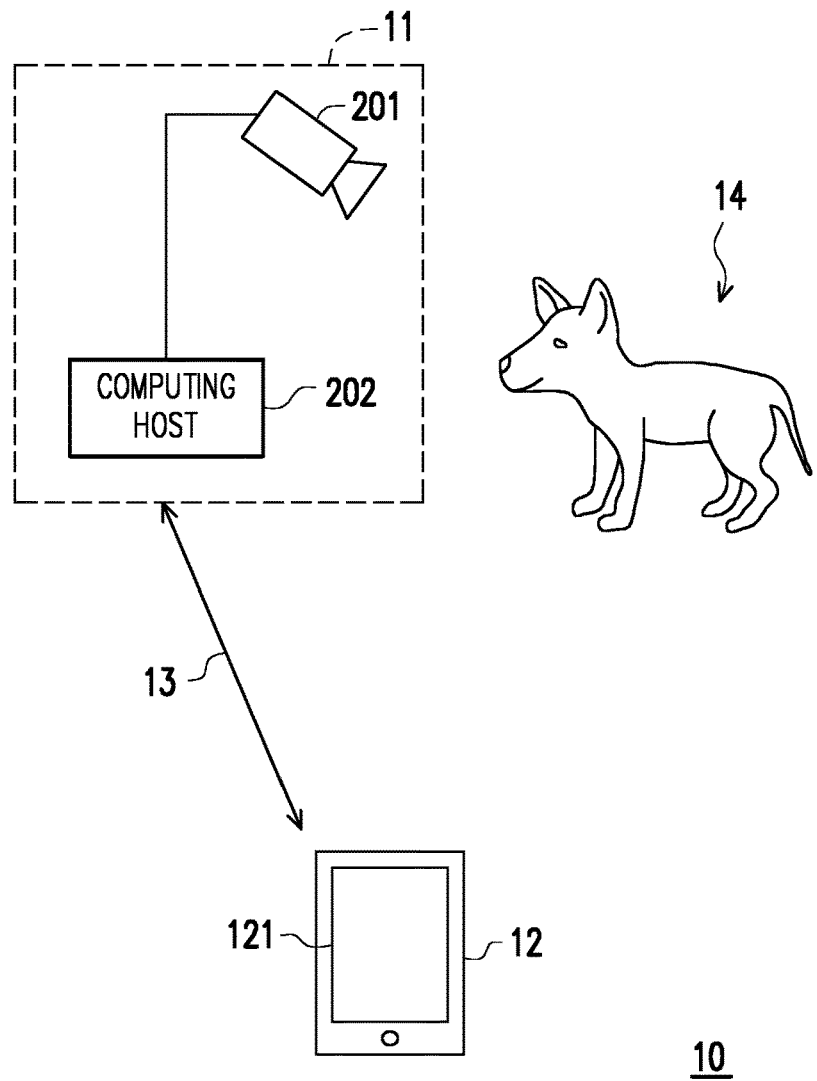
FIG. 1 is a schematic view of a pet monitoring system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
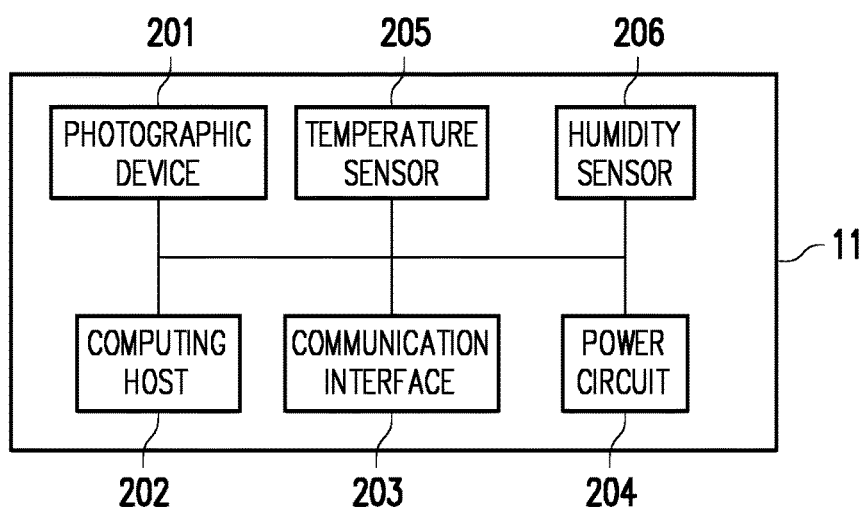
FIG. 2 is a function block diagram of a local monitoring system according to an embodiment of the disclosure.

FIG. 1 is a schematic view of a pet monitoring system according to an embodiment of the disclosure. FIG. 2 is a function block diagram of a local monitoring system according to an embodiment of the disclosure.

Referring to FIGS. 1 and 2, a pet monitoring system 10 includes a local monitoring system 11 and a remote device 12. The local monitoring system 11 and the remote device 12 can communicate with each other via a connection 13. The connection 13 can include a wired network and/or a wireless network. The local monitoring system 11 can be installed indoor to obtain information on an image of a pet 14, an image of excrement of the pet 14, a body temperature of the pet 14 and a temperature and/or humidity of excrement of the pet 14. For example, image, temperature and/or humidity monitoring ranges of the local monitoring system 11 can cover a possible activity range of the pet 14, such as one or more rooms at home, when an owner goes out.

The local monitoring system 11 includes a photographic device 201, a computing host 202, a communication interface 203, a power circuit 204, a temperature sensor 205 and a humidity sensor 206. The computing host 202 is connected to the photographic device 201, the communication interface 203, the power circuit 204, the temperature sensor 205 and the humidity sensor 206.

The photographic device 201 can include at least one lens used for capturing an image (also called a "real-time image") of the pet 14. For example, the photographic device 201 can include a general optical lens, an infrared lens and the like. The disclosure is not limited to the type and number of lenses in the photographic device 201. In addition, the lens of the photographic device 201 is movable (e.g., it can be rotated to shoot images at different angles) or not movable (e.g., it cannot be rotated, but merely shoots images at a fixed angle). The disclosure is not limited thereto.

The computing host 202 is configured to control the local monitoring system 11 (i.e. the photographic device 201, the communication interface 203, the power circuit 204, the temperature sensor 205 and the humidity sensor 206). For example, the computing host 202 can include a central processing unit, a graphics processor, an embedded controller, other programmable general purpose or special purpose microprocessors, a digital signal processor, a programmable controller, an application-specific integrated circuit, a programmable logic device or other similar devices or a combination thereof. In addition, the computing host 202 can further include a volatile memory module such as random access memory and the like and/or a non-volatile memory module such as read-only memory, flash memory and the like to store images and other data that are obtained.

The communication interface 203 can include a wired network interface and/or a wireless network interface and communicate with the remote device 12 via the connection 13. The power circuit 204 can include a power adaptor and/or a power supply circuit such as a battery and the like, and is configured to supply power to the local monitoring system 11.

The temperature sensor 205 is configured to sense a temperature of the pet 14 and/or a temperature of excrement of the pet 14. The humidity sensor 206 is configured to sense the humidity of the excrement of the pet 14. It should be noted that in an embodiment, at least one of the temperature sensor 205 and the humidity sensor 206 can be excluded from the local monitoring system 11. In addition, in an embodiment, at least one of the temperature sensor 205 and the humidity sensor 206 is movable (e.g., it can be rotated to detect temperatures and/or humidity in different directions) or not movable (e.g., it cannot be rotated, but detects temperatures and/or humidity in a fixed direction). However, the disclosure is not limited thereto.

In an embodiment, the local monitoring system 11 can further include signal input/output devices such as a microphone, a screen, a loudspeaker and/or a buzzer. When going out, a user can interact with the pet 14 at home by these signal input/output devices.

After the photographic device 201 obtains an image of the pet 14, the computing host 202 can perform at least one of an exercise status detection, an excretion status detection and a danger status detection (also called "danger posture detection") of the pet 14 according to the image. The exercise status detection of the pet 14 is a detection of exercise status (e.g., moving distance and/or a moving speed over a period of time) of the pet 14 performed when an owner goes out. The excretion status detection of the pet 14 is a detection of excretion status of the pet 14 (e.g., whether the pet 14 defecates and/or urinates) performed when the owner goes out. The danger status detection of the pet 14 is a detection of whether the pet 14 exhibits dangerous behavior (e.g., climbing) performed when the owner goes out.

After a detection result is obtained, the computing host 202 can transmit the detection result to the remote device 12 by the communication interface 203. The remote device 12 can be a smartphone, a tablet computer, a laptop computer, a desktop computer, or other types of electronic devices having displaying, communication and computing functions. The remote device 12 can present pet management information on a management interface according to the detection result. For example, the remote device 12 can have a screen 121. The management interface can be displayed on the screen 121. The pet management information can reflect the detection result of the at least one of an exercise status detection, an excretion status detection and a danger status detection of the pet 14 over the past period of time.

In an embodiment, the management interface can further provide more operating functions, such as a voice interaction function and/or a remote control function. The voice interaction function is to receive voices of a remote user by a microphone of the remote device 12 and output the invoices by a loudspeaker of the local monitoring system 11 so as to interact with the pet 14 through the voices. For example, when the pet 14 is detected to be climbing, which is a dangerous posture, a user can make sounds to give warnings or call the pet 14. The remote control function is to control a lens angle of the photographic device 201, switch a photographic mode (e.g., switching to an infrared photographic mode) of the photographic device 201 and control a receive volume of a microphone in the local monitoring system 11 and/or a playback volume of a loudspeaker in the local monitoring system 11.

In an embodiment, in the initialization stage, the remote device 12 can provide a setting interface. For example, the setting interface can be displayed on the screen 121. The remote device 12 can receive an input operation by a user through the setting interface to obtain identification information on the pet 14 that includes information on the physique and/or color of the pet 14. The information on the physique of the pet 14 can include a length, a width and height of the physique and/or a ratio of the physique length, width and height of the pet 14. The information on the color of the pet 14 can include the color of a certain body part such as a face, back and/or legs of the pet 14.

In an embodiment, the user can input the information on the physique and/or color of the pet 14 by hand through the setting interface. For example, the setting interface can show at least one data field where the user enters the ratio of the physique length, width and height of the pet 14 and/or selects the color of a certain body part of the pet.

The remote device 12 can transmit identification information on the pet 14 to the local monitoring system 11 according to the input operation. The computing host 202 can perform image identification of the pet 14 according to the identification information. For example, the computing host 202 can identify an image of the pet 14 in images obtained by the photographic device 201 later according to the ratio of the physique length, width and height and/or the color of a certain body part of the pet 14 among the identification information. Afterward, the computing host 202 can analyze the image according to the identification information on the pet 14 and perform the at least one of an exercise status detection, an excretion status detection and a danger status detection of the pet 14.

In an embodiment, in the initialization stage, the photographic device 201 can shoot an image of the pet 14 and transmit the image to the remote device 12 that can present the image the setting interface and receive the input operation by a user. Afterward, the computing host 202 can automatically obtain identification information on the pet 14 according to the input operation.

Figure 3:
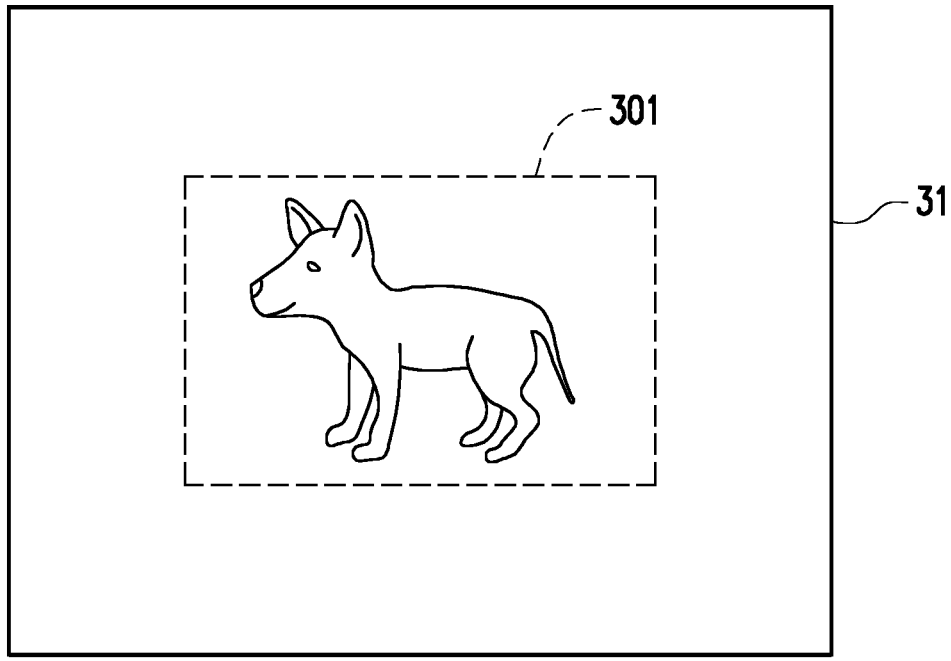
FIG. 3 is a schematic view of a setting interface according to an embodiment of the disclosure.

FIG. 3 is a schematic view of a setting interface according to an embodiment of the disclosure. Referring to FIGS. 1 and 3, it is assumed that an image 31 is an image presented in the setting interface in the initialization stage. A user can circle an image range 301 by the setting interface. The computing host 202 or the remote device 12 can analyze an image within the image range 301 and automatically obtain the identification information on the pet 14 such as a ratio of a physical length, width and height of the pet 14 and/or the color of a certain body part of the pet 14. In addition, the image range 301 can also be in other shape to meet the outline of the pet 14. However, the disclosure is not limited thereto.

In an embodiment, when performing the exercise status detection of the pet 14, the computing host 202 can analyze several images of the pet 14 provided by the photographic device 201 to obtain a moving speed of the pet 14. The moving speed reflects moving distance of the pet 14 per time unit over the past period of time. The computing host 202 can obtain the exercise status detection of the pet 14 according to the moving speed. For example, the computing host 202 can determine whether the moving speed of the pet 14 is greater than a speed threshold value within a certain time range. If the moving speed of the pet 14 is greater than the speed threshold value within the time range, the computing host 202 can determine that exercise status of the pet 14 within the time range as running. On the contrary, if the moving speed of the pet 14 within the time range is not greater than the speed threshold value, the computing host 202 can determine that the exercise status of the pet 14 within the time range as walking.

According to a detection result of the exercise status, the computing host 202 can store exercise status information on the pet 14 over the past period of time. For example, the exercise status information can reflect that the pet 14 walks for N minutes and runs for M minutes and reflect the maximum moving speed, the average moving speed, a moving range and/or a moving path and the like. The computing host 202 can transmit the exercise status information to the remote device 12 by the communication interface 203. A management interface of the remote device 12 can present the exercise status information.

In an embodiment, when performing the excretion status detection of the pet 14, the computing host 202 can analyze an image provided by the photographic device 201 to obtain a new object in the image. For example, the new object can be obtained by comparing two consecutive images. If a certain object is not present in the prior image, but appears in the next image, the computing host 202 can identify the object as the new object.

In an embodiment, the computing host 202 can obtain a body temperature of the pet 14 and a temperature of the new object by the temperature sensor 205. The computing host 202 can compare the body temperature of the pet 14 and the temperature of the new object. If the body temperature of the pet 14 is consistent with the temperature of the new object, it means the temperature of the new object is close to the body temperature of the pet 14, so the computing host 202 can determine that the pet 14 excretes and determine the new object as excrement of the pet 14. For example, the computing host 202 can determine whether a difference between the body temperature of the pet 14 and the temperature of the new object is lower than a threshold value. If the difference between the body temperature of the pet 14 and the temperature of the new object is lower than the threshold value, the computing host 202 can determine that the body temperature of the pet 14 is consistent with the temperature of the new object. On the contrary, if the difference between the body temperature of the pet 14 and the temperature of the new object is not lower than the threshold value, the computing host 202 can determine that the body temperature of the pet 14 is inconsistent with the temperature of the new object. The threshold value can be a predetermined value or vary with the current temperature of the pet 14. However, the disclosure is not limited thereto. In addition, when the body temperature of the pet 14 is inconsistent with the temperature of the new object, it means the new object is probably not produced by the pet 14. Thus, the computing host 202 can determine that the pet 14 does not excrete and that the new object is not excrement of the pet 14.

In an embodiment, the temperature sensor 205 includes at least one movable temperature sensor. When detecting a new object showing up in an image, the computing host 202 can control the temperature sensor 205 to be directed at the pet 14 to detect the body temperature of the pet 14 and/or to be directed at the new object to detect the temperature of the new object.

In an embodiment, when performing the excretion status detection, the computing host 202 can choose not to detect the temperature of the pet 14. For example, the computing host 202 can directly determine whether the pet 14 excretes and/or whether the new object is excrement according to whether the temperature of the new object is greater than a temperature threshold value. If the temperature of the new object is greater than the temperature threshold value, the computing host 202 can determine that the pet 14 excretes and that the new object is excrement of the pet 14. On the contrary, if the temperature of the new object is not greater than the temperature threshold value, the computing host 202 can determine that the pet 14 does not excrete and that the new object is not excrement of the pet 14.

In an embodiment, when performing the excretion status detection of the pet 14, the computing host 202 can further detect a type of excrement. For example, the computing host 202 can obtain the humidity of the new object by the humidity sensor 206 and determine whether the new object is excrement or urine according to the humidity of the new object. For example, the computing host 202 can determine whether the humidity of the new object is greater than a humidity threshold value. If it is determined that the pet 14 excretes and that the humidity of the new object is greater than the humidity threshold value, the computing host 202 can determine that an excretion operation by the pet is urinating and that the new object is urine. On the contrary, if it is determined that the pet 14 excretes, but the humidity of the new object is not greater than the humidity threshold value, the computing host 202 can determine that the exercise operation by the pet 14 is defecating and that the new object is excrement.

In an embodiment, when performing the excretion status detection, the computing host 202 can also analyze an image to obtain a shape of the new object. The computing host 202 can further determine whether the pet 14 excretes and/or whether the new object is excrement according to the shape of the new object. For example, if the new object is in the predetermined shape of a circle, an ellipse, a lump and the like, the computing host 202 can determine that the pet 14 excretes and that the new object is excrement of the pet 14. It should be noted that during the excretion status detection, one of the above determination mechanisms can be used alone, or at least two of the determination mechanisms can be combined together to enhance determination accuracy. For example, in an embodiment, only when the new object is in a certain predetermined shape, and the body temperature of the pet 14 is consistent with the temperature of the new object is the new objected determined as excrement.

According to a detection result of the excretion status detection, the computing host 202 can store excretion status information on the pet 14 over the past period of time. For example, the excretion status information can reflect whether the pet 14 has excreted over the past period of time, excretion time and/or a type of excrement. The computing host 202 can transmit the excretion status information to the remote device 12 by the communication interface 203. The management interface of the remote device 12 can present the excretion status information.

In an embodiment, when performing the danger status detection of the pet 14, the computing host 202 can analyze an image provided by the photographic device 201 to determine whether the pet 14 is exhibiting dangerous behavior such as climbing and the like. For example, the computing host 202 can obtain a width and height of an outline of the pet 14 in the image and determine whether the pet 14 is climbing according to the width and the height. The width refers to a width of the outline of the pet 14 in a horizontal direction, and the height refers to height of the outline of the pet 14 that is perpendicular to the horizontal direction. A ratio of width to height can be represented by width:height.

In an embodiment, the computing host 202 can store a predetermined ratio of width to height corresponding to climbing behavior of the pet 14. When the pet 14 is climbing up, the ratio of width to height of the outline of the pet 14 in an image could meet the predetermined ratio of width to height. Therefore, if the ratio of width to height of the outline of the pet 14 in the image is detected to meet the predetermined ratio of width to height, the computing host 202 can determine that the pet 14 is climbing up.

In an embodiment, the computing host 202 can analyze an image to detect a face of the pet 14. For example, the computing host 202 can perform facial identification on the pet 14 in the image. According to a result of facial identification, the computing host 202 can determine that the pet 14 faces the photographic device 201, faces away the photographic device 201 or faces the photographic device 201 sideways. In addition, the computing host 202 can analyze the image to detect a number of legs of the pet 14 on the ground in the image and determine whether the pet 14 is climbing according to the result of facial identification of the pet 14, the number of legs of the pet 14 on the ground in the image and the width and height of the outline of the pet 14 in the image.

For example, at a certain time point, if the pet 14 faces the photographic device 201 or faces way the photographic device 201, the number of legs of the pet 14 on the ground in the image is two, and a ratio of width to height of the outline of the pet 14 in the image meets the first predetermined ratio of width to height (such as 3:6.5), the computing host 202 can determine that the pet 14 is climbing. Alternatively, at another time point, if the pet 14 faces the photographic device 201 sideways, the number of legs of the pet 14 on the ground in the image is one, and the ratio of width to height of the outline of the pet 14 in the image meets a second predetermined ratio of width to height (such as 2:6.5), the computing host 202 can determine that the pet 14 is climbing. The second predetermined ratio of width to height differs from the first predetermined ratio of width to height.

It should be noted that pets of different physiques could have different ratios of width to height. Thus, the predetermined ratio of width to height, the first predetermined ratio of width to height and the second predetermined ratio of width to height can vary with actual needs. The disclosure is not limited thereto.

In an embodiment, when performing the danger status detection of the pet 14, the computing host 202 can further analyze an image to determine whether the pet 14 enters a predetermined area. The predetermined area can be an area that is inappropriate for pets, such as a kitchen and the like. The predetermined area corresponds to one or more image areas in the image. If the outline of the pet 14 overlaps with at least a portion of the image area, the computing host 202 can determine that the pet 14 enters the predetermined area.

In an embodiment, in the initialization stage, the photographic device 201 can shoot an image first and transmit the image to the remote device 12. The remote device 12 can present the image in the setting surface and receives the input operation by a user. For example, the user can circle at least one area in the image. Afterwards, the computing host 202 can set the area circled by the user to the predetermined area according to the input operation.

According to a detection result of the danger status detection, the computing host 202 can store danger status information of the pet 14 over the past period of time. For example, the danger status information can reflect whether the pet 14 has climbed and/or entered the predetermined area over the past period of time. The computing host 202 can transmit the danger status information to the remote device 12 by the communication interface 203. The management interface of the remote device 12 can present the danger status information.

In an embodiment, in response to the detection result of the at least one of an exercise status detection, an excretion status detection and a danger status detection of the pet 14, the computing host 202 can present a warning or notification to the remote device 12. The warning or notification can include words, voices and/or vibration to inform the user of the remote device 12 of the current status of the pet 14 at home.

Figure 4:
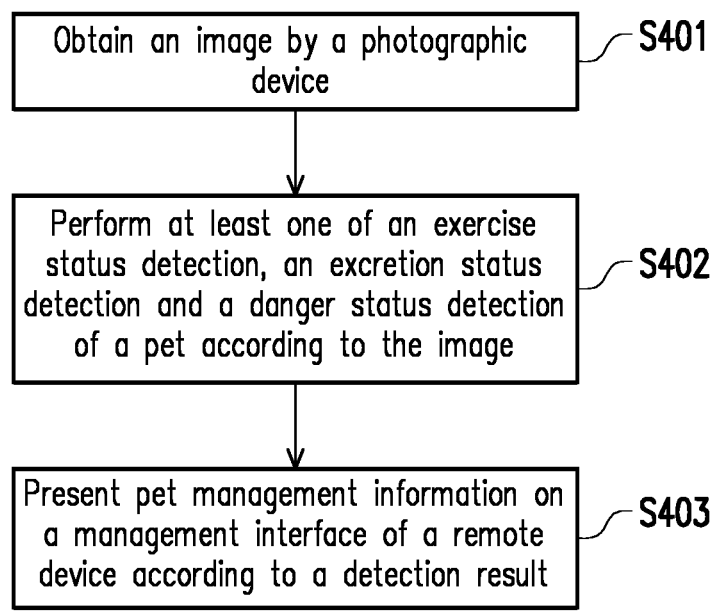
FIG. 4 is a flowchart of a pet monitoring method according to an embodiment of the disclosure.

FIG. 4 is a flowchart of a pet monitoring method according to an embodiment of the disclosure. Referring to FIG. 4, in step S401, images are obtained by a photographic device. In step S402, the at least one of an exercise status detection, an excretion status detection and a danger status detection of the pet is performed according to the image. In step S403, pet management information is presented on a management interface of a remote device according to a detection result.

Figure 5:
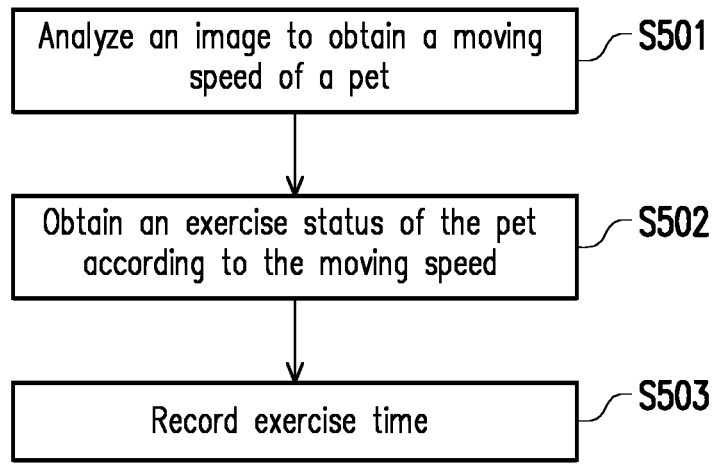
FIG. 5 is a flowchart of a pet monitoring method according to an embodiment of the disclosure.

FIG. 5 is a flowchart of a pet monitoring method according to an embodiment of the disclosure. Referring to FIG. 5, in step S501, an image is analyzed to obtain a moving speed of the pet. In step S502, the exercise status of the pet is obtained according to the moving speed. In step S503, the exercise time of the pet is stored according to the exercise status.

Figure 6:
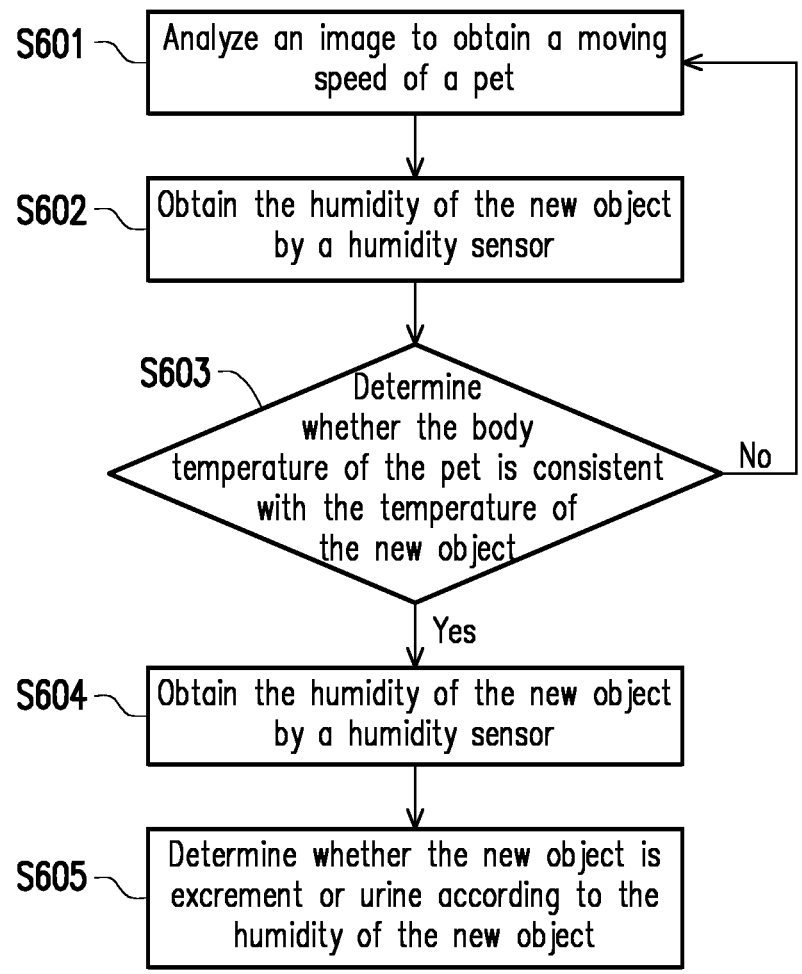
FIG. 6 is a flowchart of a pet monitoring method according to an embodiment of the disclosure.

FIG. 6 is a flowchart of a pet monitoring method according to an embodiment of the disclosure. Referring to FIG. 6, in step S601, an image is analyzed to obtain a new object in an image. In step S602, a body temperature of the pet and a temperature of the new object are obtained by a temperature sensor. In step S603, whether the body temperature of the pet is consistent with the temperature of the new object is determined. If the body temperature of the pet is consistent with the temperature of the new object, humidity of the new object is obtained by a humidity sensor in step S604. In step S605, whether the new object is excrement or urine is determined according to the humidity of the new object. In addition, in step S603, if it is determined that the body temperature of the pet is inconsistent with the temperature of the new object, return to step S601, whether the new object appears in the image is being detected continuously.

Figure 7:
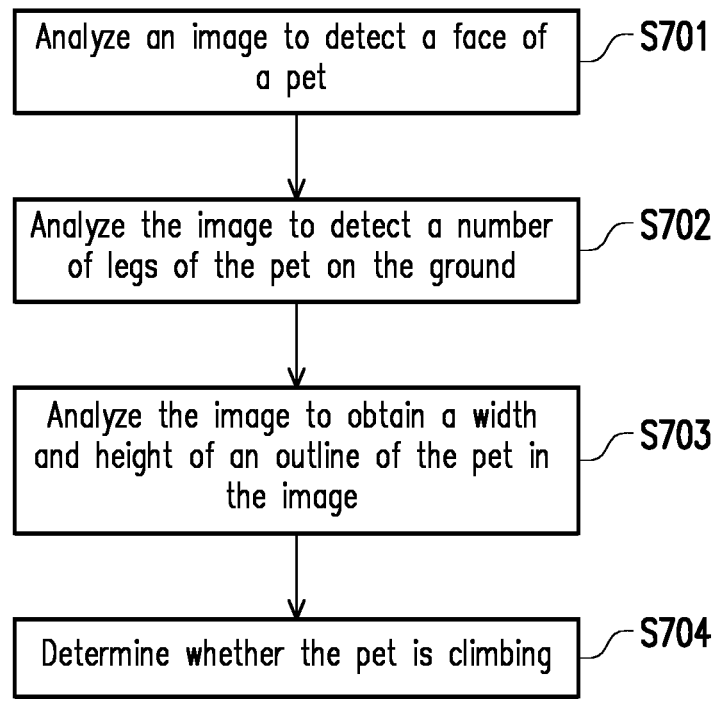
FIG. 7 is a flowchart of a pet monitoring method according to an embodiment of the disclosure.

FIG. 7 is a flowchart of a pet monitoring method according to an embodiment of the disclosure. Referring to FIG. 7, in step S701, an image is analyzed to detect a face of the pet. In step S702, the image is analyzed to detect a number of legs of the pet on the ground. In step S703, the image is analyzed to obtain a width and height of an outline of the pet in the image. In step S704, whether the pet is climbing is determined according to information obtained from at least one of steps S701 to S703.

However, each step in FIGS. 4 to 7 has been described in detail above. The redundant descriptions are omitted herein. It should be noted that each step in FIGS. 4 to 7 can be performed by a plurality of program codes or circuits. The disclosure is not limited thereto. In addition, the method of FIGS. 4 to 7 can be conducted along with the above examples or be conducted alone. The disclosure is not limited thereto.

Figure 8:
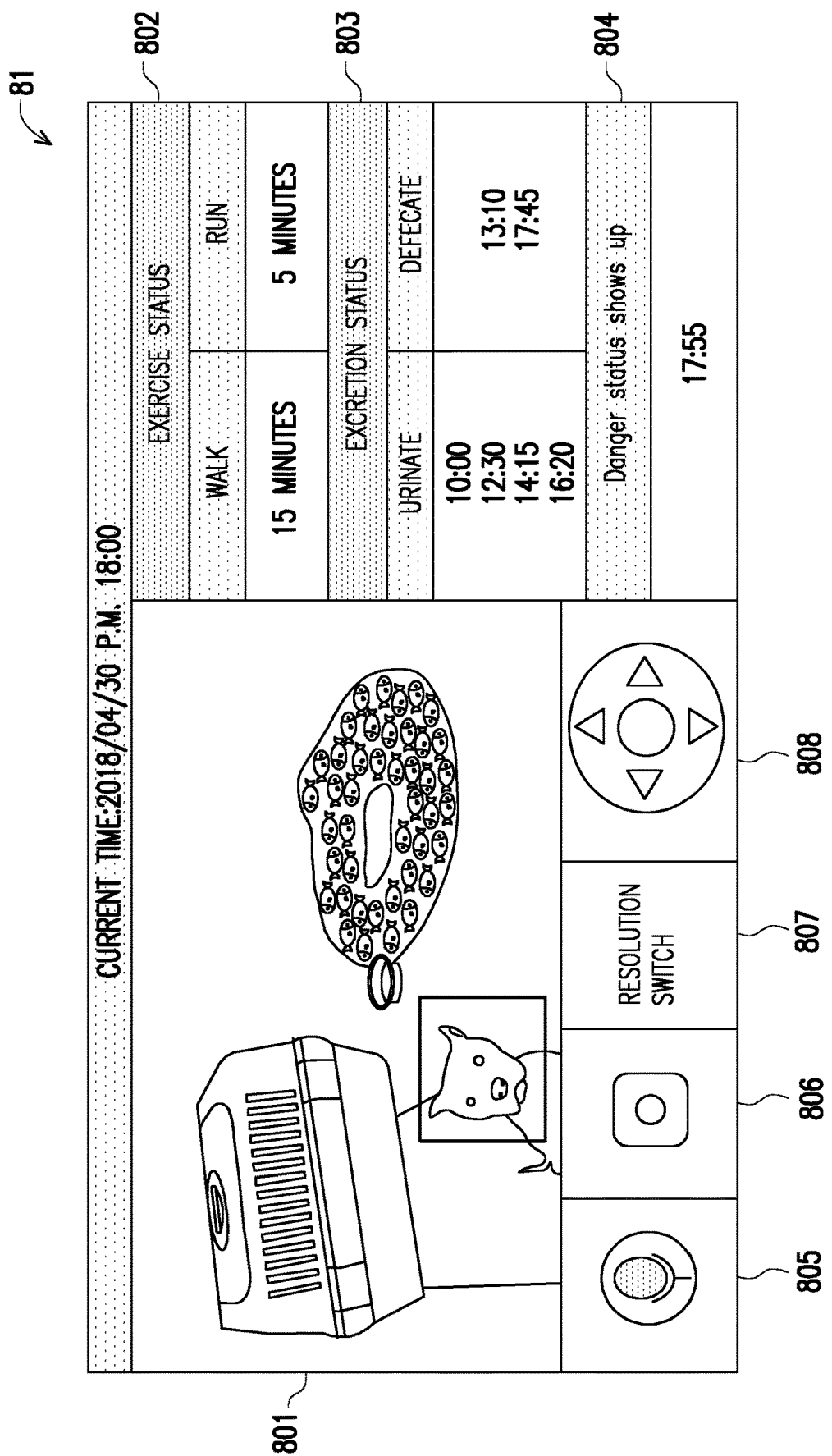
FIG. 8 is a schematic view of a management interface according to an embodiment of the disclosure.

FIG. 8 is a schematic view of a management interface according to an embodiment of the disclosure. Referring to FIGS. 1 and 8, a management interface 81 can include a main image area 801, an exercise status area 802, an excretion status area 803 and a danger status area 804. The main image area 801 is configured to display real-time images of an pet at home. For example, the image of the pet 14 obtained by the photographic device 201 can be instantly displayed on the main image area 801. The exercise status area 802 is configured to present exercise status information on the pet. For example, the exercise status information in FIG. 8 shows that the pet has walked for 15 minutes and run for five minutes over the past period of time. The excretion status area 803 is configured to present excretion status information on the pet. For example, the excretion status information in FIG. 8 shows that the pet has urinated at 10 am, 12:30 pm, 2:15 pm and 4:20 pm and excreted at 1:10 pm and 5:45 pm. The danger status area 804 is configured to present danger status information on the pet. For example, the danger status information in FIG. 8 reflects that the pet has exhibited dangerous behavior (e.g., climbing or entering a prohibited area) at 5:55 pm.

In an embodiment, a user can control the local monitoring system 11 and/or interact with the pet 14 by the management interface 81. For example, the management interface 81 can further include function buttons 805 to 808. The function button 805 is configured to activate a microphone of the remote device 12 and a loudspeaker of the local monitoring system 11. Next, voices of the user can be recorded by the microphone of the remote device 12 and played by the loudspeaker of the local monitoring system 11 so that the user can interact with the pet 14 through the voices. The function button 806 is configured to activate a snapshot function. For example, when the user presses the function button 806, the remote device 12 can capture a current image of the main image area 801. The function button 807 is configured to switch the resolution of the image of the main image area 801. The function button 808 is configured to control the shooting angle of the photographic device 201 of the local monitoring system 11, such as performing movement in upward, downward, left and right directions, etc.

In view of the foregoing, after an image about the pet is obtained, the at least one of an exercise status detection, an excretion status detection and a danger status detection of the pet can be performed according to the image. Afterward, the pet management information can be presented on the management interface of the remote device according to the detection result. By analyzing the behavior of the pet automatically through the detection of images, temperatures and/or humidity, the disclosure can improve traditional image monitoring technology effectively. When going out, the user need not to watch the indoor images all the time. The system can automatically report the motion status of the pet at home to the user so that the user can enhance the efficiency of managing the pet at home when going out. In addition, the pet monitoring method and system can also apply to other places, such as a zoo or an animal research center and the like, and are not limited to general households.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pet monitoring method, comprising:
obtaining an image by a photographic device;
performing at least one of an exercise status detection, an excretion status detection and a danger status detection of a pet according to the image; and
presenting pet management information on a management interface of a remote device according to a detection result,
wherein the step of performing the excretion status detection of the pet according to the image comprises:
analyzing the image to obtain a new object in the image;
obtaining a body temperature of the pet and a temperature of the new object by a temperature sensor; and
determining that the pet excretes when the body temperature of the pet is consistent with the temperature of the new object.

2. The pet monitoring method of claim 1, further comprising:
providing a setting interface by the remote device; and
receiving an input operation by the setting interface to obtain identification information on the pet.

3. The pet monitoring method of claim 1, wherein the step of performing the exercise status detection of the pet according to the image comprises:
analyzing the image to obtain a moving speed of the pet; and
obtaining an exercise status of the pet according to the moving speed.

4. The pet monitoring method of claim 1, wherein the step of performing the excretion status detection of the pet according to the image further comprises:
obtaining humidity of the new object by a humidity sensor; and
determining that the new object is excrement or urine according to the humidity of the new object.

5. The pet monitoring method of claim 1, wherein the step of performing the danger status detection of the pet according to the image comprises:
analyzing the image to determine whether the pet is climbing.

6. The pet monitoring method of claim 5, wherein the step of analyzing the image to determine whether the pet is climbing comprises:
obtaining a width and a height of an outline of the pet in the image; and
determining whether the pet is climbing according to the width and the height.

7. The pet monitoring method of claim 6, wherein the step of performing the danger status detection of the pet according to the image further comprises:
- analyzing the image to perform a facial detection of the pet;
- analyzing the image to detect a number of legs of the pet on a ground; and
- determining whether the pet is climbing according to a result of the facial detection and the number of the legs on the ground.

8. The pet monitoring method of claim 1, wherein the step of performing the danger status detection of the pet according to the image comprises:
- analyzing the image to determine whether the pet enters a predetermined area.

9. A pet monitoring system, comprising:
- a photographic device, configured to obtain an image;
- a computing host, connected to the photographic device and configured to perform at least one of an exercise status detection, an excretion status detection and a danger status detection of a pet according to the image;
- a remote device, configured to present pet management information on a management interface according to a detection result of the computing host; and
- a temperature sensor, connected to the computing host,
- wherein the step of performing the excretion status detection of the pet by the computing host according to the image comprises:
  - analyzing the image to obtain a new object in the image;
  - obtaining a body temperature of the pet and a temperature of the new object by the temperature sensor; and
  - determining that the pet excretes when the body temperature of the pet is consistent with the temperature of the new object.

10. The pet monitoring system of claim 9, wherein the remote device is further configured to provide a setting interface to receive an input operation to obtain identification information on the pet.

11. The pet monitoring system of claim 9, wherein the step of performing the exercise status detection of the pet by the computing host according to the image comprises:
- analyzing the image to obtain a moving speed of the pet; and
- obtaining an exercise status of the pet according to the moving speed.

12. The pet monitoring system of claim 9, further comprising:
- a humidity sensor, connected to the computing host,
  - wherein the step of performing the excretion status detection of the pet by the computing host according to the image further comprises:
  - obtaining humidity of the new object by the humidity sensor; and
  - determining that the new object is excrement or urine according to the humidity of the new object.

13. The pet monitoring system of claim 9, wherein the step of performing the danger status detection of the pet by the computing host according to the image comprises:
- analyzing the image to determine whether the pet is climbing.

14. The pet monitoring system of claim 13, wherein the step of analyzing the image by the computing host to determine whether the pet is climbing comprises:
- obtaining a width and a height of an outline of the pet in the image; and
- determining whether the pet is climbing according to the width and the height.

15. The pet monitoring system of claim 14, wherein the step of analyzing the image by the computing host to determine whether the pet is climbing comprises:
- analyzing the image to perform a facial detection of the pet;
- analyzing the image to detect a number of legs of the pet on a ground; and
- determining whether the pet is climbing according to a result of the facial detection and the number of the legs on the ground.

16. The pet monitoring system of claim 9, wherein the step of performing the danger status detection of the pet by the computing host according to the image comprises:
- analyzing the image to determine whether the pet enters a predetermined area.

* * * * *